United States Patent [19]

Macchiarulo et al.

[11] Patent Number: 4,708,703
[45] Date of Patent: Nov. 24, 1987

[54] V-BELT FOR CONTINUOUS SPEED VARIATORS

[75] Inventors: Vincenzo Macchiarulo, Chieti; Carlo Fiordaliso, Pescara, both of Italy

[73] Assignee: Pirelli Transmissioni Industriali S.p.A., Milan, Italy

[21] Appl. No.: 944,527

[22] Filed: Dec. 22, 1986

[30] Foreign Application Priority Data

Dec. 20, 1985 [IT] Italy .............................. 23317 A/85

[51] Int. Cl.$^4$ .............................................. F16G 5/10
[52] U.S. Cl. ................................. 474/268; 474/263; 474/270
[58] Field of Search .............. 474/268, 263, 265, 249, 474/250–252, 205, 201, 270

[56] References Cited

U.S. PATENT DOCUMENTS 2,514,429 7/1950 Waugh .......................... 474/263 X

FOREIGN PATENT DOCUMENTS 0188854 7/1986 European Pat. Off. ............ 474/263
0047034 4/1980 Japan ................................... 474/268

*Primary Examiner*—Stephen J. Novosad
*Assistant Examiner*—Thuy M. Bui
*Attorney, Agent, or Firm*—Oblon, Fisher, Spivak, McClelland, & Maier

[57] ABSTRACT

A V-belt for continuous speed variators and which is formed of a visco-elastomeric material and includes a group of teeth formed on upper and lower parts thereof. The two groups of teeth are opposed to one another with each having a substantially equal base-surface. Each of said teeth is at least partially covered by a stiffening element that is oriented transverse to the belt and extends to opposite sides of the belt. Lateral surfaces of each pair of opposing teeth for contacting with corresponding pulleys are comparable in shape.

14 Claims, 12 Drawing Figures

V-BELT FOR CONTINUOUS SPEED VARIATORS

BACKGROUND OF THE INVENTION

1. Field of the Invention

The present invention is directed to a V-belt used in particular, for continuous speed variators, and, still more specifically, to a V-belt made of a viscoelastomeric material, comprising two groups of teeth disposed on the upper and lower portions respectively, of the belt.

2. Background of the Prior Art

As is known, in many of the applications of these belts, the V-belts transmit horsepower when contacting the flanks of the trapezoidal groove of the pulleys, which are characterized by having a very small winding diameter, for example, of 70 mm or even less.

These belts must be able to adapt to said small bending radii of the pulleys without sustaining any ruptures or any slits appearing in the elastomeric material wherein various reinforcing elements are embedded therein.

For attaining the cited aim, there has already been provided to make a special toothing in the lower portion of the belt in such a manner as to allow for the belt to have a good degree of longitudinal flexibility during its winding over the pulleys. Unfortunately, the formation of the teeth in the belt body can lead to their buckling under peak loads as a result of combined high compression and bending loads, transmitted by the pulley flanks in transmitting motion. Hence, there exists a limit to the service life of the presently known V-belts and particularly, in the field of continuous transmission for speed variators, where the horsepower to be transmitted is quite high, and the corresponding thrusts can exceed, for example, a load of 200 Kg on four or five teeth when contacting the flanks of the grooved pulley.

For resolving the above-cited drawback, one can contemplate stiffening of the belt, for example, by having recourse to transverse struts that terminate at the sides with an inclination corresponding to that of the opposite flanks, in a grooved pulley. In this case, in being directly in contact with the pulley flanks, said struts could allow for a certain increase in the horsepower as compared with the previously cited belts.

However, as is understandable, said struts constitute elements that can alter both the construction as well as the function of the elastomeric V-belts, i.e. since it is no longer the elastomeric part of the belt flanks that receives and transmits horsepower upon coming into contact with the pulley but rather the above-noted struts. Often these struts are cumbersome, too robust, too difficult to be applied and, in particular, are excessively heavy and therefore, under the working conditions of a belt when it is transmitting motion at high speeds, the struts can cause intolerable stresses on the belt body owing to the effect of the centrifugal force.

SUMMARY OF THE INVENTION

The object of the present invention is to provide a visco-elastomeric V-belt to be used, in particular, for continuous speed variators, and that is suitable for increasing the horsepower transmitted between the flanks of the belt and the pulley, without slipping taking place and moreover, while obviating that an increase of horsepower is obtained to the detriment of the longitudinal flexibility of the belt.

The object of the present invention is to provide a V-belt, in particular for continuous speed variators, comprising a visco-elastomeric belt body, a plurality of parallel inextensible inserts mounted in said belt and oriented in a longitudinal direction of said belt body, upper and lower portions of said belt body comprising a first and second group of teeth, each of said first and second groups of teeth including first and second teeth having a groove formed therebetween, said belt body including opposite flanks for contacting with corresponding surfaces of grooves of said first and second grooved pulleys; and a plurality of stiffening elements disposed transverse to the belt body and positioned on each of said teeth of said first and second groups of teeth, said stiffening elements covering at least part of an outer surface of each of said teeth between opposite flanks of said belt body, and said stiffening elements having a greater modulus of rigidity than that of said elastomeric material of said belt body, wherein said teeth of said first and second groups of teeth are opposed to one another and have an equal base surface.

The present invention is further directed to a V-belt, in particular, for continuous speed variators and which is formed of a visco-elastomeric material, having a group of teeth formed on both upper and lower portions of the belt.

The teeth of said two groups of teeth are opposed to each other, each of said teeth having substantially equal base-surfaces. Each tooth is at least partially covered by a stiffening element that is oriented transverse to the belt, and extends to the proximity of opposite sides or flanks of the belt. Preferably, the lateral surfaces of each pair of opposing teeth that are intended for contacting with the pulley are comparable to one another.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3a shows a perspective view of an embodiment of the transverse stiffening elements placed on the teeth of the V-belt, of FIG. 1a;

FIG. 6 shows one of the layers forming the belt of FIG. 1a;

DETAILED DESCRIPTION OF THE PREFERRED EMBODIMENTS

Figure 1A:
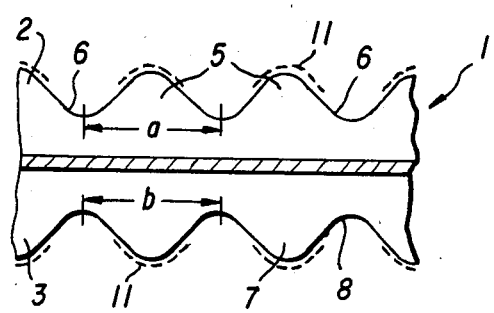
FIG. 1a shows a partial longitudinal view of the belt according to the present invention.
Figure 1B:
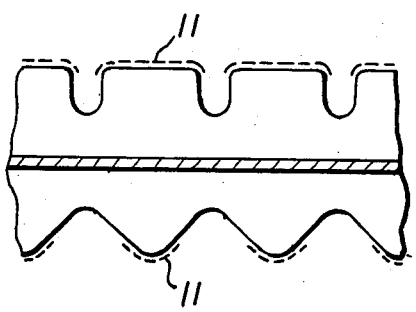
FIG. 1b shows an alternate embodiment of the present invention.

In FIGS. 1a and 1b, numeral 1 indicates an elastomeric V-belt comprising a double group of teeth 2 and 3, respectively located above and below the neutral axis of the belt, distinguished by a plurality of unextensible cords 4 oriented longitudinally of the belt.

The first group of teeth comprises a plurality of teeth 5 alternated with grooves 6. The second group of teeth comprises a plurality of teeth 7 alternated with grooves 8.

According to a fundamental characteristic of the invention, the grooves and teeth of the first group of teeth are opposed to the grooves and teeth of the second group of teeth, and the base surfaces, (a and b) of the teeth 5 and 7, are equal to one another.

According to another characteristic of the present invention, the areas of the lateral surfaces of the teeth that are opposed to one another are for contacting the flanks of the two pulleys 9 and 10 that form part (See FIG. 2) of a transmission for continuous speed variators.

Moreover, the areas of the lateral surfaces of the opposed teeth 5 and 7 are comparable to one another. By this expression is meant that the area of the lateral surface of one of the teeth can be equal to that of the other tooth, or less, up to a value equal to 70% of the area of the other tooth.

Figure 3A:
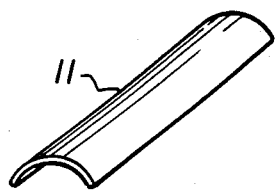

The belt 1, according to the invention, is further characterized by the presence of stiffening elements 11 disposed transverse to the direction of the belt (FIG. 3), applied on the outermost portion on each tooth 5 and 7 as has been traced, for simplicity sake, in FIG. 1.

The transverse stiffening elements 11 have a higher modulus of rigidity than the elastomeric material of the belt, and can be formed of metal, for example, of springsteel, of light alloys, or of plastic such as polyamide resin or equivalent plastic materials.

The transverse stiffening element 11 can be specially reinforced with stiffening-ribs directed longitudinally (not shown) for the purpose of increasing their rigidity and, in general, such can have a thickness of between 0.2 and 3 mm.

Figure 4:
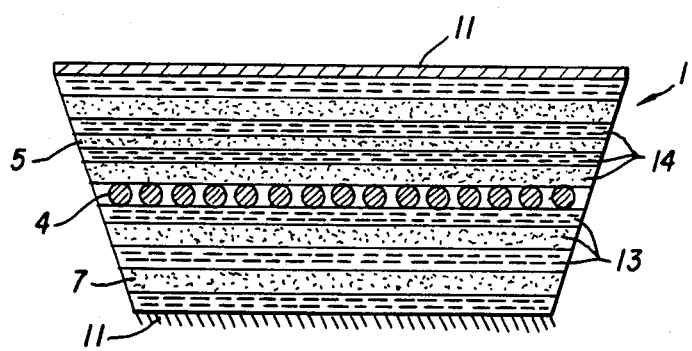
FIG. 4 shows a transverse sectional view of the belt taken along the opposed teeth of the two groups of teeth.
Figure 5:
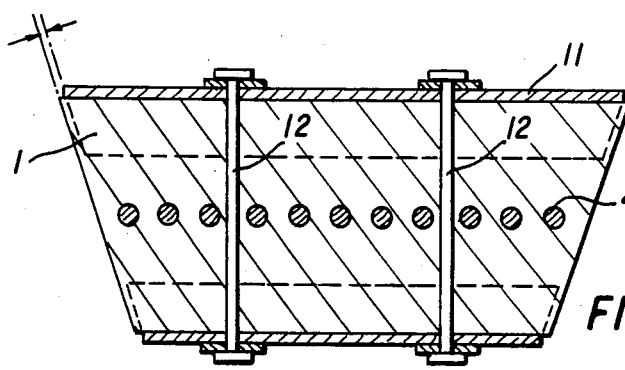
FIG. 5 shows a transverse sectional view of the belt wherein the stiffening elements are applied on the teeth by means of rivets.

Moreover, the stiffening elements 11 can be applied to the belt either by sticking with adhesives already known in rubber-to-metal bonding, or with a rubberplastic bonding (See FIG. 4), or else by special rivets 12 passing through the belt body as has been illustrated in FIG. 5.

In each of the above-listed solutions, the stiffening elements 11 must be extended substantially as much as the belt-width, in such a way that this stiffening involves the entire tooth structure without leaving masses of elastomeric material mobile at the belt extremities. For example, for a belt having a width of 42 mm, the stiffening element 11 can be applied to the tooth with an extension of 39 mm. Generally, the extension of the element is between 1% and 15% less than the tooth width, and preferably, less than 10%.

Figure 2:
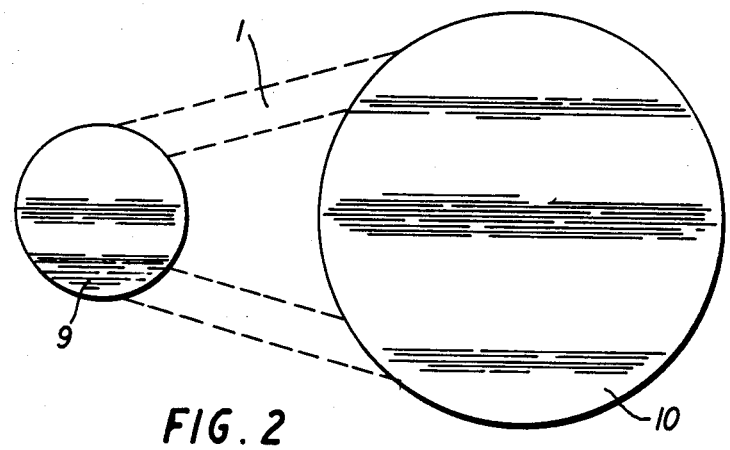
FIG. 2 shows a transmission for continuous speed variators wherein the belt of FIG 1a is utilized.

In the preferred embodiment, the two groups of teeth are characterized by teeth delimited by a curvilinear outline, for example: an arc of a circle, a parabolic curve, an elliptical arc, either involute or else, in equivalent curvilinear forms that result for graduating the impact received by the teeth upon coming into contact with the opposite flanks of the pulley 9, or of the pulley 10, in FIG. 2.

Also preferably, the teeth with the curvilinear profile are covered, at their tops, by a reinforcing and stiffening element 11 having the form of the arc of a circle, said form being more suitable for tolerating the forces, transmitted by the pulleys, towards the top of the tooth.

In an embodiment which is particularly apt for the functioning of a transmission for continuous speed variators, the belt 1 comprises, above and below the neutral plane which embeds the longitudinal cords 4, a plurality of radial layers, or sheets, of elastomeric material (13, 14), each embedding fibers being oriented in a single direction.

According to this embodiment, the layers are alternatively overlapped, some with their fibers oriented substantially in a longitudinal direction, and others with their fibers oriented substantially in a transverse direction.

Figure 6:
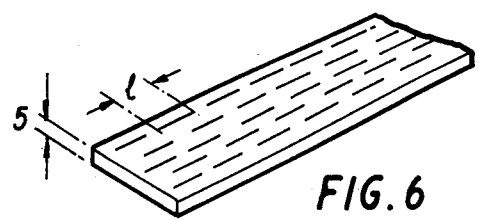

Moreover, in the previously indicated embodiment (FIG. 4), the thickness s (FIG. 6) of each layer is less than, or at least equal to, the average length l of the fibers present in the layer. More particularly, the thickness of the layer comprising the fibers oriented in a given direction is less than, or at least equal to, one-half the average length of the fibers that are embedded in the layer.

Speaking generally of possible applications, the belt 1 can comprise aramid fibers known as KEVLAR, or those made of nylon, or even polyester, or rayon, having a length of between 0.5 mm and 5 mm, and a diameter of between 10 microns and 400 microns.

In one example, the fibers are made of KEVLAR, with an average length l of 1.5 mm. The thickness of the layer, wherein the fibers are embedded, is 0.4 mm. The hardness of the layers wherein the fibers are embedded is between 80 and 98 Shore A or even with greater hardness values that are measured in the Shore D scale.

Figure 3B:
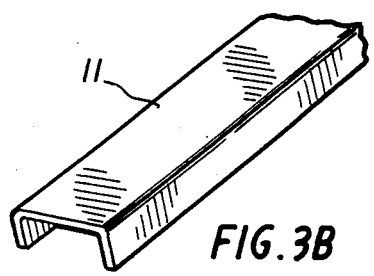
FIG. 3b shows a stiffening element for the upper teeth of FIG. 1b.

In a further embodiment, the belt can include (See FIG. 1b) lower teeth with a curvilinear profile, and upper teeth with a profile having rectilinear tracts. The upper group of teeth, in this embodiment, include the supporting elements 11 of a corresponding form (FIG. 3b).

Figure 7:
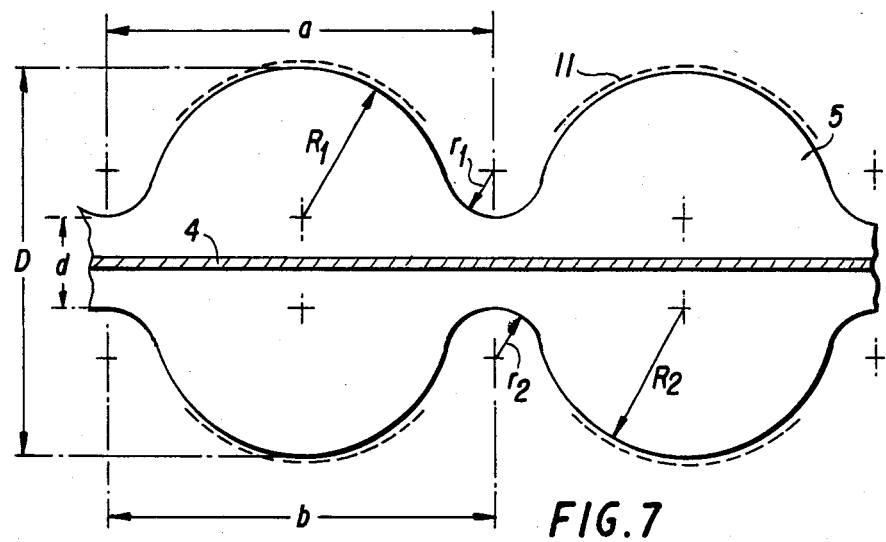
FIG. 7 shows a particular example of a belt utilized for the transmission of motion of FIG. 2.

In FIG. 7 there is described, by way of example, a belt having a double grouping of teeth and having several layers of KEVLAR fibers that are suitable for being applied in transmission of motion for continuous speed variators comprising two pulleys 9 and 10 (FIG. 2) having maximum and minimum winding diameters of between 70 and 200 mm. The geometrical dimensions of these belts, as shown in FIG. 7, are as follows:

bending radius $R_1$ of the upper tooth wherein $R_1=55$ mm;

radius $r_1$ of the groove between two adjacent teeth of the upper toothing wherein $r_1=1.5$ mm;

width a of the base-surface of the upper tooth wherein $a=14.65$ mm;

distance of the transverse stiffening element 11 of the upper tooth, from the edge of the belt body$=1$ mm;

bending radius $R_2$ of the lower tooth wherein $R_2=55$ mm;

bending radius $r_2$ of the groove, between two continuous teeth, of the lower group of teeth wherein $r_2=1.5$ mm;

width b of the base-surface of the lower tooth wherein $b=14.65$ mm;

distance of the transverse stiffening element 11 of the lower tooth from the edge of the belt body=1 mm;

maximum distance D between the opposite teeth, upper and lower wherein D=18 mm;

distance d between the opposite groove-bases of the upper teeth and of the lower teeth wherein d=5 mm.

The belt of the present invention satisfies all the above-noted aims.

The fundamental characteristic of the belt lies in its capacity to increase, with respect to the known solutions, the horsepower transmitted between the belt and pulley, by utilizing both the lateral surfaces of two groups of teeth, disposed above and below the neutral axis, during their contact with the corresponding pulley flanges. The resultant increase in horsepower could be explained by the fact that both of the groups of teeth are provided with transverse stiffening elements extended so as to nearly coincide with opposite edges of the belt flanks.

To the particular presence and disposition of said transverse stiffening elements, there can be attributed not only the cited increase in horsepower since their rigidity translates into a corresponding high transverse rigidity of the belt body to which they are associated but, above all, the possibility of increasing the service life of the present belt while also maintaining unaltered the maximum horsepower transmitted to the pulleys.

Figure 8:
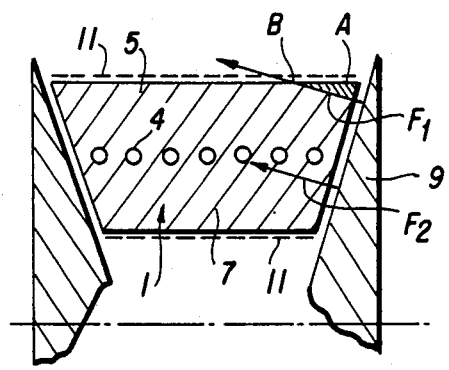
FIG. 8 shows a diagram illustrating the transmission of thrusts from the pulley-flanks towards the flanks of the V-belt.

In fact, from a review of FIG. 8 it can be seen that the belt is subjected (apart from anything else) to the two thrusts $F_1$ and $F_2$ exercised by the pulley flanks in a direction perpendicular to the belt flanks. The thrust $F_2$ is communicated to the inextensible longitudinal cords which pass through the neutral axis of the belt. Therefore, seeing that the longitudinal inserts occupy the entire belt width to the proximity of its edges, the absence of cracks or ruptures is verified along the central zone outside the belt.

In turn, the thrust $F_1$ is discharged directly upon the upper stiffening element 11, while protecting the upper portion of the tooth from rips or gaps at the edges of the elastomeric material. The above described favorable situation would not be verified had the belt's upper grouping of teeth not have been provided with the transverse stiffening element.

In fact, in the latter case, the thrust $F_1$ would tend to separate or to consume the triangular portion A that is shown with a broken line in FIG. 8, and cause, with the passing of time, a lesser transmission of horsepower and speed-up the gradual spreading of the cracks in the elastomeric material, and the consequent shorter service life of the belt.

The same negative situation would be verified if the belt, contrary to what is foreseen in the present invention, had a stiffening element disposed on the tooth 5, with a limited extension until point B, i.e., quite a distance from the lateral edge of the belt. The same positive considerations made for the present belt can also be made for the lower teeth 7, that is to be provided with a stiffening element 11 having a length that is substantially equal to the distance in-between the flanks.

The present belt's capacity for allowing an increase in the horsepower, transmitted and received from the pulleys, in a constant manner through the passage of time, can again be explained by the fact that the longitudinal inserts are not altered in their disposition on the neutral plane by the presence of the two elastomeric masses corresponding to the two groups of teeth. In fact, one can surmise that the disposition of pairs of opposed teeth having an equal base is not sufficient for generating contrasting thrusts directed towards the neutral axis and which are not balanced when, for example, the pairs of stiffening elements are locked to each other by means of rivets passing through them.

In particular, the solution consisting of lateral surfaces of the two toothings with area-values comparable with each other is a further characteristic that seems to be conclusive for confirming the absence of distortions on the cords—i.e., of those drawbacks which could be verified if the mass of a tooth, placed above the neutral axis, differed from that of the tooth below the neutral axis, for example, if the base of a tooth were shorter than that relative to the opposed tooth. In particular, the solution relative to the stiffening elements fixed adhesively to the teeth of the belt body also presents a high transverse resistance to the deformation, while allowing for increasing the horsepower that is attained with the present invention.

In practice, it is noted that the entire elastomer located between the two stiffening elements is prevented from being deformed under compression, since the eventual radial expansion of the elastomer, resulting from its yielding under compression, would not succeed in shifting the various pairs of rigid elements disposed between the pulley flanges and subjected to a peak load.

Moreover, in this solution it is verified that all the points of the outermost elastomeric surfaces of the teeth can be perfectly adhered to the inner contacting surface of the respective stiffening elements which, in turn, have their extremities maintained under compression by the opposite flanks of the pulley.

Hence, any deformation whatsoever of the belt portion located between a pair of stiffening elements would tend to cause detaching of the elastomeric material from the inner surface of the rigid elements and such circumstance would once again be prevented by the complete adhesive bond existing between the teeth and elements. Therefore, through its being capable of absorbing the elevated thrusts between the pulley flanks, without transverse deformations taking place, the present solution proves suitable for increasing the horsepower to be transmitted between belt and pulley.

Furthermore, this solution obviates any indenting, cutting, or any involvement of the ring wherein the longitudinal cords are disposed—i.e., since, as has been seen, means that perforate the elastomeric body, such as rivets and suchlike, are entirely lacking. Consequently, the belt always uniformly distributes the load absorbed over all the cords.

Moreover, by being devoid of rivets or such means that pass through the belt body, said solution can include and guarantee the integrity of any eventual reinforcing fabric layers, disposed either in the upper or lower positions to the ring, wherein the longitudinal cords are disposed.

As regards the belt having stiffening elements that are connected to the teeth by means of rivets, the possibility has to be pointed out of greatly preloading two great elastomeric masses which are disposed in opposition to one another. In fact, the preloading action, because of the presence of stiffening elements which are extended substantially as far as the distance existing between the belt flanks, involves all the various elastomeric layers and, in particular, those with transverse fibers.

Therefore, the resistance to compression of the layers having transverse fibers loaded by the pulley flanks, can be compared to that of the rigid materials, such as sheets, slabs of metal, or rigid plastic, nevertheless, without permitting the drawback of limited longitudinal flexibility.

Figure 9:
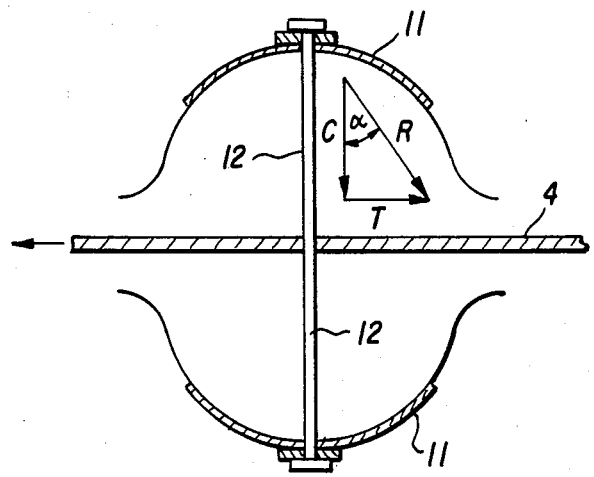
FIGS. 9 and 10 serve to explain the advantages obtained with the pre-compression determined by the rivets passing into the belt body.
Figure 10:
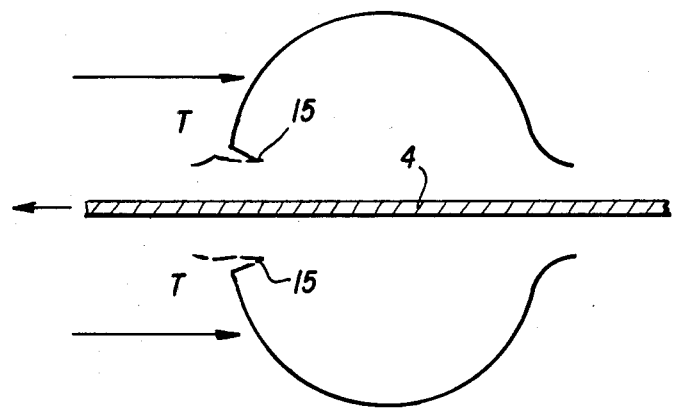

In particular, the presence of traction elements, connecting the pairs of stiffening elements, generates an advantageous state of compression C for the layers forming the belt body (FIGS. 9 and 10). This state of compression obviates any eventual phenomena of detachment taking place between the various layers forming the belt body, generated by the shearing stress T, that are caused by the transmission of horsepower.

This particular realization with tie-rods allows for obtaining transmission torques that are three times greater than those known to date and without priming detachments 15 (FIG. 10) in-between the upper and the lower layer of the belt, as occurs with respect to the resistant element 4.

This greater resistance is conferred by the resultant R between forces of compression and shearing stresses, whose inclination α, with respect to the axis of the tie-rod, can, according to the invention, be made less than 30° by acting on the precompression value C.

Although some special realizations according to the present invention have been illustrated and described here, what are also held to be included within their ambit are all the possible alternative variations that are accessible to the one skilled in the art including, for example, the fact that the belt of FIG. 4 could be placed alongside other similar belts for the transmission of motion with the pulleys having several side-by-side grooves.

Again, for example, the belt could be formed of polyurethane, or of neoprene, or of a similar material, and the belt body could have one or more reinforcing fabrics in it.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A V-belt for continuous speed-variators having a first and second grooved pulley, comprising:
   a belt body;
   a plurality of parallel inextensible inserts mounted in said belt and oriented in a longitudinal direction of said belt body, upper and lower portions of said belt body comprising a first and second group of teeth, each of said first and second groups of teeth including first and second teeth having a groove formed therebetween, said belt body including opposite flanks for contacting with corresponding surfaces of grooves of said first and second grooved pulleys; and
   a plurality of stiffening elements disposed transverse to the belt body and positioned on each of said teeth of said first and second groups of teeth, said stiffening elements covering at least part of an outer surface of each of said teeth between opposite flanks of said belt body, and said stiffening elements having a greater modulus of rigidity than that of said elastomeric material of said belt body, wherein said teeth of said first and second groups of teeth are opposed to one another and have an equal base surface.

2. A V-belt as claimed in claim 1, wherein lateral surfaces of opposed pairs of teeth of said first and second groups of teeth are of similar shape.

3. A V-belt as claimed in claim 1, wherein said stiffening elements are extendable by between 1% and 15% of a value of a distance existing between said opposite flanks of said belt body.

4. A V-belt as claimed in claim 1, wherein said belt comprises a plurality of elastomeric layers positioned respectively in a radially inner and outer portion of said belt body.

5. A V-belt as claimed in claim 4, wherein said layers comprise fibers oriented in a single direction and wherein the layers are overlapped alternatively such that a first layer is oriented substantially in a longitudinal direction and an adjacent layer is oriented in a substantially transverse direction, the thickness of each layer being less than an average length of the fibers present in said layers.

6. A V-belt as claimed in claim 1, wherein said teeth of said first and second groups of teeth are of the same external contour.

7. A V-belt as claimed in claim 1, wherein said teeth of said first and second groups of teeth have a substantially curvilinear contour.

8. A V-belt as claimed in claim 7, wherein root portions of said teeth of said first and second groups of teeth are joined to said belt along an arc of a circle having a radius of between 0.8 and 2.5 mm.

9. A V-belt as claimed in claim 1, further comprising means for connecting said supporting elements to said belt body.

10. A V-belt as claimed in claim 9, wherein said means for connecting said supporting elements further comprise means for controlling a precompressional state of said elastomeric material between said stiffening elements.

11. A V-belt as claimed in claim 1, wherein said stiffening elements are adhered to said teeth of said first and second groups of teeth.

12. A V-belt as claimed in claim 1, wherein said stiffening elements have a thickness of between 0.2 and 2.0 mm.

13. A V-belt as claimed in claim 2, wherein said belt body comprises a plurality of elastomeric layers positioned in a radially inner and outer portion of said belt body.

14. A V-belt as claimed in claim 3, wherein said belt body comprises a plurality of elastomeric layers positioned in a radially inner and outer portion of said belt body.

* * * * *

UNITED STATES PATENT AND TRADEMARK OFFICE
CERTIFICATE OF CORRECTION

PATENT NO. : 4,708,703
DATED : 11-24-87
INVENTOR(S) : Vincenzo Macchiarulo & Carlo Fiordaliso It is certified that error appears in the above-identified patent and that said Letters Patent is hereby corrected as shown below:

Title page, Item [73] should read:

-- Pirelli Trasmissioni Industriali S.p.A., Milan, Italy--

Signed and Sealed this

Third Day of May, 1988

*Attest:*

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,708,703

DATED : NOVEMBER 24, 1987

INVENTOR(S) : VINCENZO MACCHIARULO et al

It is certified that error appears in the above-identified patent and that said Letters Patent is hereby corrected as shown below:

In column 8, line 12, delete "of" and insert "less than".

Signed and Sealed this

Ninth Day of August, 1988

Attest:

DONALD J. QUIGG

*Attesting Officer*  *Commissioner of Patents and Trademarks*